United States Patent [19]

Reyenga

[11] Patent Number: 5,059,154
[45] Date of Patent: Oct. 22, 1991

[54] GRAIN CLEANER AND DESTRUCTOR OF FOREIGN MATTER IN HARVESTING CROPS

[75] Inventor: John Reyenga, Prescott, Ark.

[73] Assignee: The Board of Trustees of The University of Arkansas, Little Rock, Ark.

[21] Appl. No.: 600,394

[22] Filed: Oct. 19, 1990

[51] Int. Cl.⁵ .............................................. A01F 12/24
[52] U.S. Cl. .................................................. 460/102
[58] Field of Search ................ 460/101, 102, 97; 56/122, 153, 164, 173, 184

[56] References Cited

U.S. PATENT DOCUMENTS

| | | | |
|---|---|---|---|
| 910,477 | 1/1909 | Robinson | 460/102 X |
| 1,235,596 | 8/1917 | Radle | 460/102 X |
| 3,581,746 | 6/1971 | Louks | 460/102 X |

Primary Examiner—Thuy M. Bui
Attorney, Agent, or Firm—Hermann Ivester

[57] ABSTRACT

A method and apparatus for removing foreign matter from a harvested crop and for destroying the foreign matter, wherein grain produced by a threshing process is passed over a screen to allow relative fine foreign matter to fall through the screen, while the grain is conveyed to a receptacle, and the foreign matter preferably is directed to a pair of rollers operative to crush the foreign matter to present germination of any seeds therein. Foreign matter removed during the threshing process also preferably is directed to a pair of rollers for crushing.

23 Claims, 2 Drawing Sheets

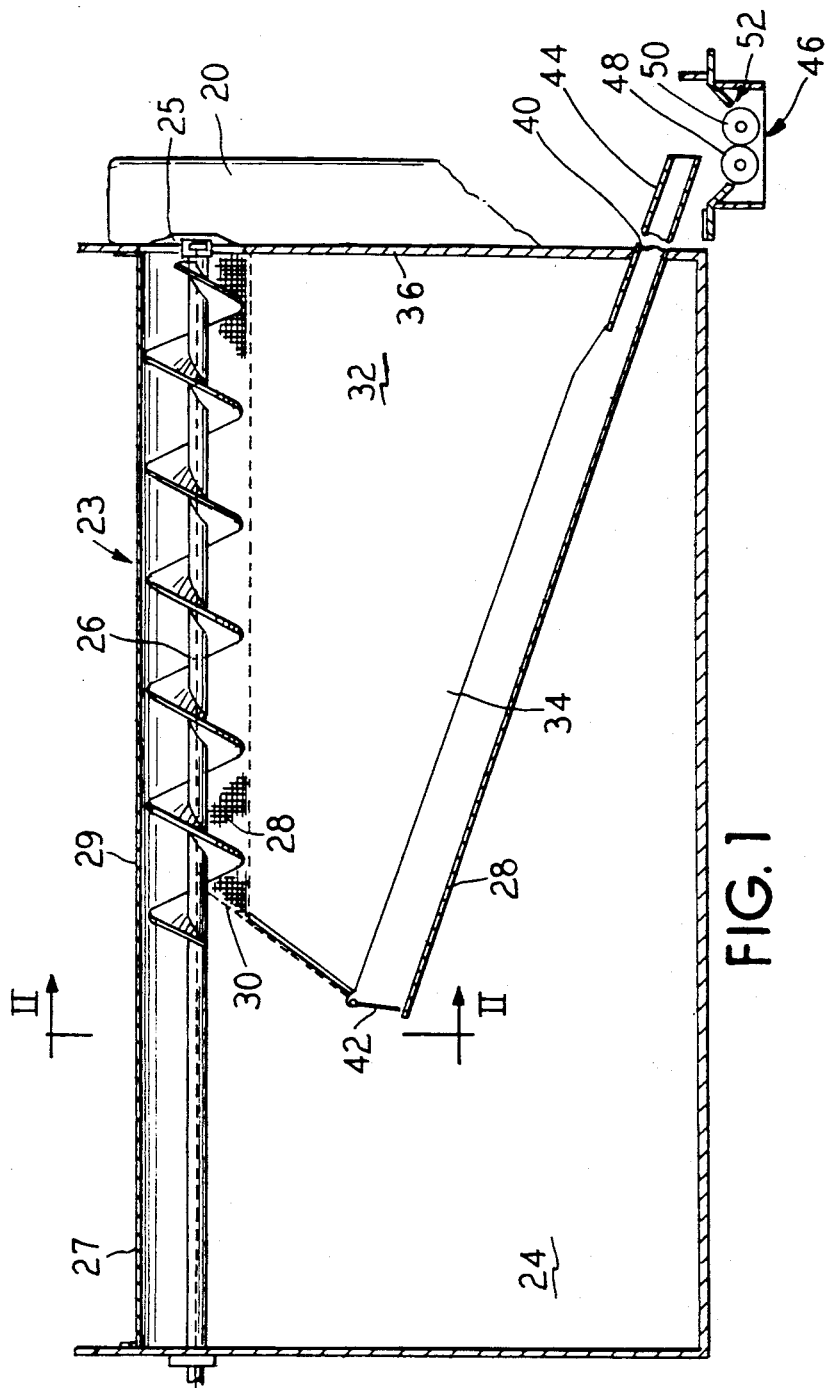
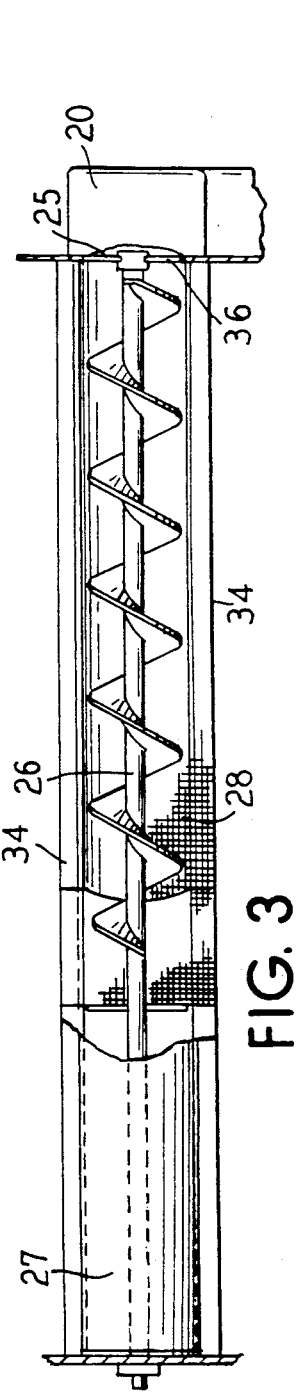
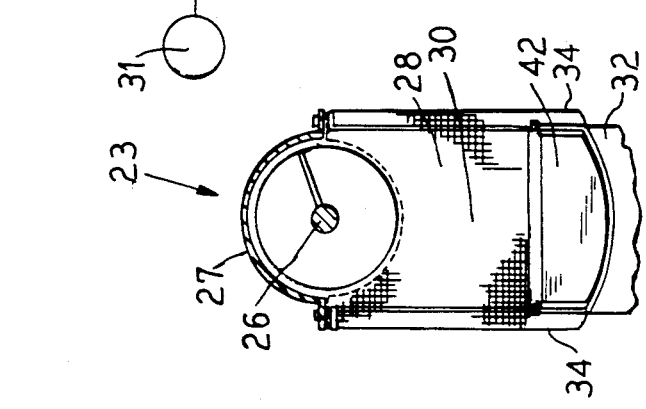

GRAIN CLEANER AND DESTRUCTOR OF FOREIGN MATTER IN HARVESTING CROPS

BACKGROUND OF THE INVENTION

The present invention generally relates to farm machinery and harvesting equipment. More particularly, the invention relates to apparatus and methods for ridding harvested crops of foreign matter such as weed seeds, insects, etc.

A combine is a vehicle used to harvest crops by cutting off plant tops and then threshing the crops by beating and separating the grains from the plants while the vehicle continues to move across a field. At a front end, blades are employed to cut down plants. The cut plants are then directed into a sieve section where they are subjected to beating and sieving to release the grain and air is blown through the sieve section to separate light foreign matter from the grain. The light foreign matter is then carried away entrained in the air. The grain is collected and then directed into a storage hopper or into an accompanying storage vehicle such as a trailer. An example of such a combine is that manufactured by International Harvester and sold under the designation Model 815.

Usually, the grain produced by the threshing process still includes weed seeds that are too heavy to be entrained in the air. Thus, the grain still includes what is referred to herein as foreign matter.

In addition to the foregoing, the matter removed from the harvested crop during threshing is returned to the ground by simply allowing the matter to be blown out the back or off to a side of the combine. Because the matter can contain a variety of seeds, these seeds can germinate and produce undesirable weeds during a subsequent planting.

Current methods for preventing such germination involve spraying chemicals. However, these chemicals can present a hazard in the food chain, as well as to the environment.

SUMMARY OF THE INVENTION

The present invention provides a method and apparatus for removing foreign matter from harvested grain and for destroying that foreign matter as well as other foreign matter removed during threshing. Additionally, the invention provides a method and apparatus for removing relatively finer matter from harvested grain and for destroying seeds removed during threshing and/or from the cleaned grain.

To these ends, in one aspect, the invention provides that grain produced from threshing is conveyed over a screen so that relatively fine matter is permitted to pass therethrough, while the relatively courser grain is conveyed into a suitable receptacle as "clean" grain.

In another aspect, the invention provides that the relatively finer foreign matter is removed from the grain under the influence of gravity.

In another aspect, the invention provides that the removed relatively fine foreign matter is directed between a pair of rollers that are operative to crush seeds contained in the foreign matter thereby to prevent germination of such crushed seeds.

In another aspect, the invention provides that foreign matter removed from a harvested crop during threshing is directed between a pair of rollers operative to crush such foreign matter thereby to prevent germination of any seeds contained within the foreign matter.

These and other aspects, as well as further features of the invention will become more apparent with reference to the following detailed description of the presently preferred embodiment and accompanying drawings.

BRIEF DESCRIPTION OF THE DRAWINGS

FIG. 1 is a cross-sectional view illustrating an apparatus for removing foreign matter from harvested grain.

FIG. 2 is a cross-sectional view of the apparatus of FIG. 1 generally taken along the line II—II of FIG. 1.

FIG. 3 is a broken away top view of the apparatus of FIG. 1.

DETAILED DESCRIPTION OF THE PRESENTLY PREFERRED EMBODIMENTS

In accordance with the invention, a combine is provided with an apparatus for ridding harvested grain of foreign matter. The foreign matter removed from the grain and, preferably, other foreign matter removed during the threshing process are destroyed before being returned to the earth so as to prevent germination of any seeds therein. An arrangement for accompanying the foregoing is illustrated in FIGS. 1-5.

Figure 4:
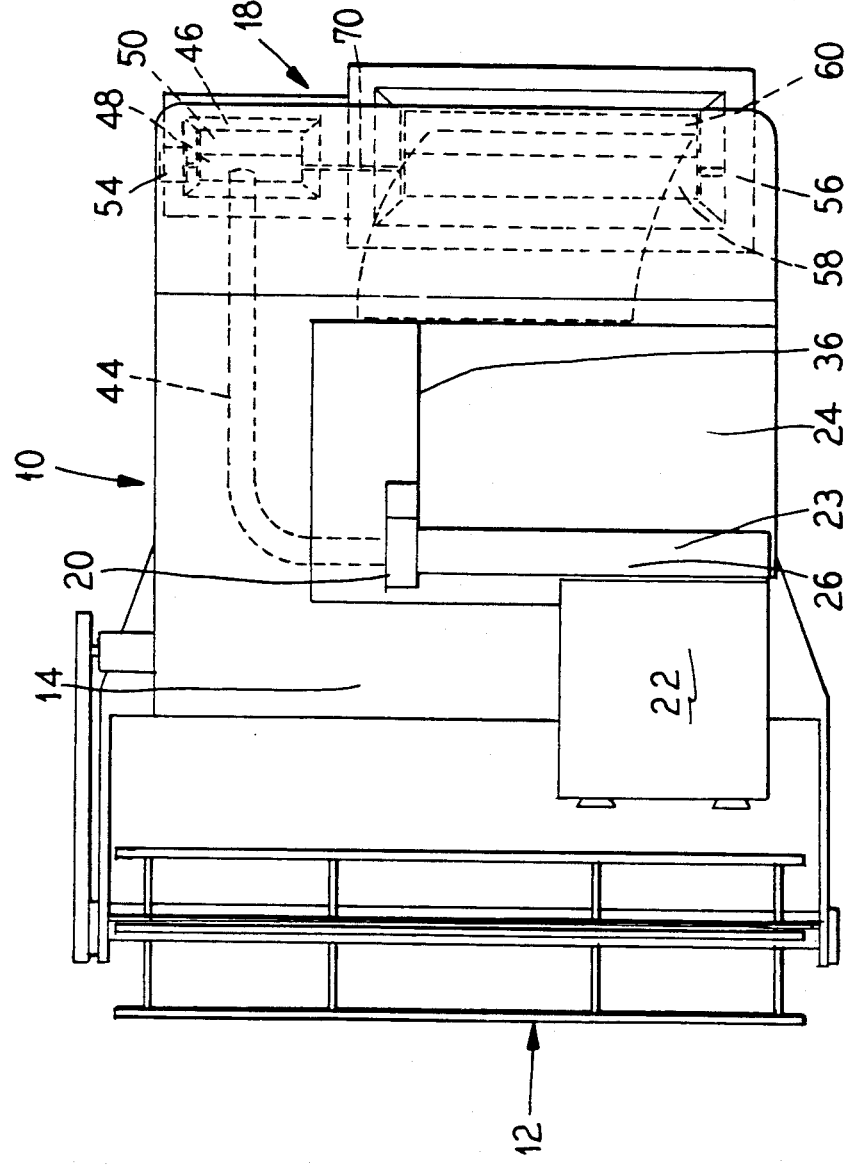
FIG. 4 is a plan view of a combine embodying the invention.

In FIG. 4 there is illustrated in plan view a combine 10, preferably a combine such as International Harvester Model 815, produced by what is now known as Navistar Corporation. The combine 10 includes a plurality of rotating blades 12 that cut off top of plants as the combine travels through a field.

The combine 10 is provided with a threshing or sieve section 14 where the plant tops are subjected to beating and sieving to separate the grains from the chaffs and other foreign matter. Air is blown through the sieves to entrain the chaffs and foreign matter therein and to carry the chaffs and foreign matter out of the sieve section to a point of discharge 16 where it is generally blown out the back end 18 of the combine 10. The grain is collected in a hopper beneath the sieves and carried by a grain elevator 20 to a bin 24.

The combine 10 is driven by and operated by a person from within a cab 22 mounted thereon. As illustrated, the threshing section 14 is positioned to the right of the cab 22 while the bin 24 is positioned behind the cab 22.

In FIG. 1, the bin 24 is illustrated within which is generally received the grain generated by the threshing process. The bin 24 is currently provided on a combine such as International harvester's Model 815. Additionally illustrated is a cleaner 23 provided to rid the harvested grain of foreign matter not removed during threshing.

Normally, the grain would fall into the bin 24 from an outlet 25 of the cleaned grain elevator 20 directly, any build-up in the bin 24 being leveled by a levelling auger 26, a feature provided on the Model 815 combine. However, one aspect of the present invention modifies the travel of the grain.

As illustrated, a screen 28 is positioned under the auger 26. The screen 28 preferably is concave in transverse cross-section and extends longitudinally from the outlet 25 of the grain elevator 20 to a point 29 about halfway along the length of the auger 26. At the point 29, a discharge end 30 is provided, that, as illustrated in FIG. 2, slopes downwardly to form a spout.

It can be appreciated that the screen 28 is formed so as to conform about the leveller auger 26 and thus, rotation of the leveler auger 26 causes the grain to be directed from the outlet 25, along the screen 28, and into the bin 24. Selection of an appropriate mesh for the screen provides for screening of the foreign matter from the grain such that the relatively coarser grain is discharged into the bin 24, while the relatively finer foreign matter, such as insects and weeds, falls through the screen 28.

A motor 31 currently provided on the model 815 combine drives the leveler auger 26 as is known. A half tube-shaped cover 27 is provided that covers the auger 26 along its length.

As illustrated most clearly in FIGS. 1 and 2, the foreign matter screened out from the grain conveyed by the leveler auger 26 falls into a substantially trapazoidally shaped collector 32 that includes as its sides the screen 28, one wall 36 of the bin 24, an inclined half tube 28, and two trapazoidal walls 34. It can be seen that foreign matter removed by the screen 28 will fall under the influence of gravity between the walls 34 and 36 and the spout and onto the inclined half tube 38. Then, gravity will cause the foreign matter to travel down the incline to an outlet 40.

At the spout end 30 of the collector 32, a door 42 is provided at one end of the inclined half tube 38. This door 42 provides an access for insertion therein of a suitable stick or pole to dislodge clumps of foreign matter that collect and plug the inclined half tube 38.

As best illustrated in FIGS. 1 and 4, the foreign matter discharged from the inclined half tube 38 is conducted to the rear of the combine 10 via a suitable conduit 44. Because the foreign matter is conducted under the influence of gravity, the conduit is suitably inclined toward the rear end of the combine 10. In a presently preferred embodiment, the conduit 44 is secured about the grain elevator 20 and supported thereon.

The foreign matter is discharged from the conduit 44 into a destructor 46 having pair a of rollers 48 and 50 that serve to crush the foreign matter before it is deposited on the ground 51 as the combine 10 travels through a field. The rollers 48 and 50 are suitably driven by a hydraulic motor 54. Alternatively, not illustrated, the rollers 48 and 50 can be powered by a suitable chain and pulling arrangement to another motor on the combine 10. The rollers 48 and 50 are appropriately seated within a sloped pocket 52 attached to the rear end of the combine 10.

The rollers 48 and 50 are spaced and designed to be operative to crush any foreign matter, thereby to destroy any seeds in the foreign matter by breaking the outer shells or skins thereof and causing extrusion of the interior matter thereof. Because the seeds are destroyed, they cannot germinate and are rendered harmless when they fall to the ground. As such, the rollers 48 and 50 provide a destructor that destroys the foreign matter such as weed seeds.

Figure 5:
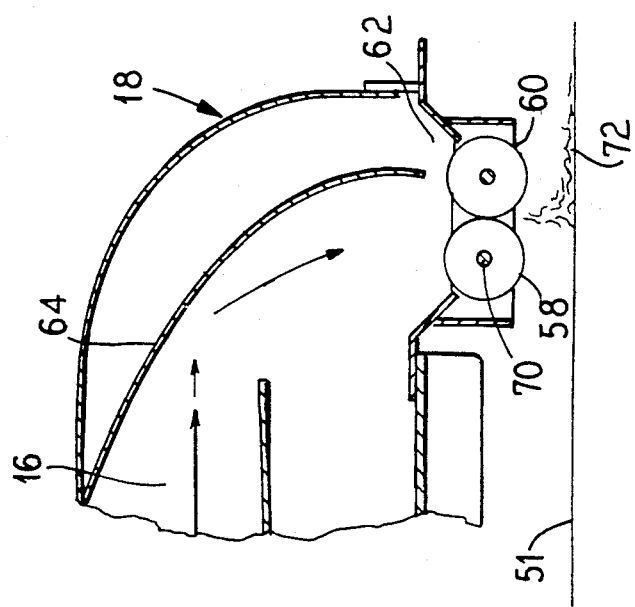
FIG. 5 is a cross-sectional view of a destructor apparatus employed on the combine of FIG. 4.

As further illustrated in FIGS. 4 and 5, a second destructor 56 having a pair of rollers 58 and 60 is provided for destroying the foreign matter produced during the threshing process. These rollers 58 and 60 are relatively larger than the rollers 48 and 50, but are similarly seated within a sloped pocket 62 at the rear of the combine 10.

A suitable deflector 64 is positioned at a rear end of the combine 10 to catch the foreign matter as it is discharged from the threshing process at the discharge 16. Normally, of course, the foreign matter would simply be discharged onto the ground out the back of the combine 10. However, the deflector 64 catches the matter and directs it between the two rollers 58 and 60 which are operative to crush the waste matter thereby to destroy any seeds therein, as described above. The crushed matter 72 is then deposited on the ground.

As illustrated in FIG. 4, preferably the rollers 58 and 60 are powered by the same hydraulic motor 54 that drives the other rollers 48 and 50. To this end, rollers 48 and 58 are suitably disposed along a common axle 70 and driven simultaneously by the motor 54.

In the preferred embodiment, the deflector 64 comprises sheet metal suitably formed with a curried panel 64a and side panels 64b to catch the matter as it is discharged from the threshing operation.

Field tests have been conducted with a combine constructed in accordance with the invention. The combine used was an International Harvester Model 815 having a spike-tooth threshing cylinder. Grain samples were collected in cloth bags from streams of flowing grain on the moving combine during actual harvesting operations. Grain samples designated as "uncleaned" were collected from a trap door in the grain elevator 20 that lifts grain from the separating sieves to the grain bin 24. Grain samples designated as "cleaned" were collected from the point of discharge from the spout 30 in the grain bin 24.

In a first field, five "cleaned" and five "uncleaned" samples were collected in random order from either the trap door of the grain elevator 20 or the point of grain exit from the discharge spout 30. In five areas of a second field, "cleaned" and "uncleaned" samples were collected simultaneously from a trap door in the upper end of the grain elevator 20 and from the point of discharge of the spout 30. In this manner, 10 grain samples weighing about 10 pounds each were collected from the fields.

Both of the fields in which the field tests were conducted were infested heavily with weeds such as johnsongrass, crabgrass, broadleaf signalgrass, various morningglories, hemp sesbania, sicklepod, pigweed, and cocklebur. Accordingly, these fields should have provided an adequate testing of the device.

An aliquot of approximately 5 pounds was removed from each sample and passed through a sample divider and split into two parts. Test weight was determined for one part while the other part was passed through the divider twice again to reduce sample size for determination of percent of foreign matter. Foreign matter was hand-picked from a 100 g sample and weighted. The weight of the foreign matter in grams was used as the percent foreign matter for the sample. An electronic moisture meter was used to measure grain moisture percentage from the remainder of the aliquot.

Data collected were subject to statistical analyses using procedures were described by Robert G. D. Steel and James H. Torrie in their publication "Principles and Procedures of Statistics", 2nd ed. pp. 67-121, 1980, McGraw-Hill, Inc., New York, N.Y. For the first harvest, the means for grain moisture percent, percent foreign matter, and test weight for the cleaned and uncleaned samples were compared using the "t" statistic. The samples from the second field were considered to be meaningfully compared because of simultaneous collection; and therefore, differences rather than sample means were analyzed. Data collected as percentages were transformed by conversion to decimal equivalents and multiplication by 1000 before analyses.

In the field test, the destructor was not operational when attached to the combine. Accordingly, the destruction process used in the field test involved routing the removed foreign matter to a detached destructor with opposing steel rollers and operating the rollers with an electric motor. Samples of the foreign materials were passed between the rollers and observed to be crushed. Weed seed appear to be rendered incapable of germination due to cracking of the seed coats and extrusion and crushing of the tissues within the seed. These materials appear to be thoroughly destroyed, and germination tests were not deemed necessary to verify that fact.

For the harvest of the first field, samples that had been collected from the spout, were found to have less foreign matter contamination collected from a trap door in the lower end of the grain elevator. A statistically significant (P<0.05) "t" value of 2.6846 (8 degrees of freedom) was calculated for the comparison of average foreign matter percentages for the cleaned and uncleaned samples. Percent grain moisture and grain test weight were not affected significantly.

For the harvest of the second field, samples that had been collected from the spout, were found to have less foreign matter contamination, lower grain moisture, and higher test weight than samples collected from the trap door in the upper end of the grain elevator. Statistically significant (P<0.01) "t" values of 8.8968, 8.4853, and 5.4177 (4 degrees of freedom) were calculated for the foreign matter, grain moisture, and test weight variables, respectively.

The following Tables 1 and 2 tabulate the resulting data produced during these field tests.

TABLE 1

Grain moisture, percent foreign matter, and test weight of soybean grain samples collected from field No. 1 near Emmet, Arkansas. University of Arkansas Southwest Research and Extension Center.

| | Cleaned | | | | Uncleaned | | |
|---|---|---|---|---|---|---|---|
| Sample Number | Grain Moisture percent | Foreign Matter percent | Test Wt. lb/bu | Sample Number | Grain Moisture percent | Foreign Matter percent | Test Wt. lb/bu |
| 1 | 13.2 | 0.5 | 55.2 | 1 | 13.3 | 1.0 | 54.5 |
| 2 | 12.9 | 0.0 | 55.0 | 2 | 13.2 | 3.5 | 54.2 |
| 3 | 13.3 | 0.5 | 55.4 | 3 | 13.4 | 1.0 | 54.8 |
| 4 | 13.3 | 1.5 | 54.6 | 4 | 13.6 | 4.0 | 53.1 |
| 5 | 12.7 | 1.0 | 52.1 | 5 | 13.3 | 4.0 | 52.5 |
| average | 13.1 | 0.7 | 54.5 | average | 13.4 | 2.7 | 53.8 |

TABLE 2

Grain moisture, percent foreign matter, and test weight of soybean grain samples collected from field No. 2 near Emmet, Arkansas. University of Arkansas Southwest Research and Extension Center.

| | Cleaned | | | | Uncleaned | | |
|---|---|---|---|---|---|---|---|
| Sample Number | Grain Moisture percent | Foreign Matter percent | Test Wt. lb/bu | Sample Number | Grain Moisture percent | Foreign Matter percent | Test Wt. lb/bu |
| 1 | 12.4 | 1.5 | 54.0 | 2 | 12.8 | 9.0 | 52.8 |
| 4 | 12.3 | 3.0 | 55.4 | 3 | 13.0 | 9.0 | 53.5 |
| 5 | 12.3 | 1.5 | 55.4 | 6 | 12.8 | 7.0 | 52.5 |
| 7 | 12.1 | 1.0 | 54.7 | 8 | 12.9 | 6.5 | 53.2 |
| 9 | 12.4 | 2.5 | 56.0 | 10 | 13.0 | 7.0 | 53.1 |
| average | 12.3 | 1.9 | 55.1 | average | 12.9 | 7.7 | 53.0 |

Insects, soil particles, stones, soybean and plant residues, and other small particles were found in the material removed from the grain. Many weed seeds were also removed. Seeds of weeds such as morningglory and hemp sesbania were found to be major contributors to the foreign matter contamination that was detected during grain grading because their relative large size and weight. The invention seemed particularly effective in removing seeds such as these. The cleaning action of the device appeared to directly reduce the amount of foreign matter contamination of the grain.

Reduction of the amount of foreign matter contamination could explain the lower grain moisture measurement in the cleaned grain samples. This material was observed to be damp because of dew condensation on the weedy trash in the field, and this dampness was transferred to the grain after harvesting. Soybean producers routinely store grain on their trucks overnight and transport to the market elevator the next morning. Soybean grain can rapidly absorb moisture from damp foreign material; and the invention is expected to produce dryer grain even without overnight storage.

Grain plus foreign matter contamination is expected to have higher test weights (weight of a standard bushel) than grain harvested without use of the invention. With less foreign matter, the individual soybean seed would "pack together" more densely, and more grain could be placed within a standard volume measure.

Observation of the material after crushing and rolling through the destructor indicated that a high percentage of living seeds and insects were destroyed.

While a preferred embodiment has been shown, modifications and changes may become apparent to those skilled in the art which shall fall within the spirit and scope of the invention. It is intended that such modifications and changes be covered by the attached claims.

I claim:

1. A combine including a device for removing foreign matter from grain harvested by the combine, said device comprising:
 a conveyor operative to convey the grain and foreign matter along a path of travel;
 a screen disposed under the conveyor along the path of travel, said screen having a mesh size selected such that said grain cannot pass through said screen while said foreign matter can pass through said screen, said screen being disposed such that said grain and foreign matter are conveyed by said conveyor along said screen;
 a collector operatively disposed beneath said screen to collect said foreign matter as it passes through said screen;
 a discharge provided at one end of said screen for discharge of said grain; and
 a receptacle operative to receive said grain as it is discharged from said discharge of said screen.

2. The combine of claim 1, wherein said collector includes an inclined bottom surface so that said foreign matter collected therein travels to a lowermost point in the collector.

3. The combine of claim 1, wherein said collector includes a discharge opening and an inclined bottom surface so that foreign matter travels towards said discharge opening from which said foreign matter is dispelled.

4. The combine of claim 3, wherein said inclined bottom surface comprises a half tubular shape.

5. The combine of claim 3, wherein said collector include two similar trapazoidally-shaped walls disposed on opposite sides of said conveyor, each of said walls having one end secured to a side of said conveyor and another edge secured to said inclined bottom surface.

6. A combine having a bin in which harvested grain is collected, a grain elevator operative to convey harvested grain to the bin, and a leveling auger disposed along a top side of the bin and extending from a discharge of the grain elevator, comprising:
 a cleaner attached to the leveling auger and operative to receive grain discharged from the grain elevator and to remove foreign matter from the grain by separating the grain and the foreign matter, said cleaner further collecting said foreign matter and discharging it; and
 a destructor carried on said combine, said destructor receiving said foreign matter discharged by said device and operative to destroy said foreign matter so that any seeds contained therein are rendered incapable of germination.

7. The combine of claim 6, wherein said cleaner comprises a screen disposed under the auger along an axis of the auger, said screen having a mesh size selected such that said grain cannot pass through said screen while said foreign matter can pass through said screen, said screen being disposed such that said grain and foreign matter are conveyed by said conveyor along said screen.

8. The combine of claim 6, wherein said cleaner further comprises a collector operatively disposed beneath said screen to collect said foreign matter as it passes through said screen.

9. The combine of claim 6, wherein said destructor comprises a pair of oppositely rotating rollers operative to crush seeds contained in said foreign matter.

10. A combine having a grain elevator operative to convey grain from a threshing process, a receptacle disposed to receive grain discharged from said grain elevator, and a leveling auger disposed along a top side of said receptacle and extending from a discharge of said grain elevator, said combine further comprising:
 a cleaner device attached to said leveling auger operative to separate foreign matter from said grain discharged from said grain elevator and to convey said foreign matter;
 a first destructor device operative to receive said foreign matter from said cleaner device and to crush said foreign matter so as to destroy any seeds therein and thereby to prevent germination of said seeds; and
 a second destructor device operative to receive waste material discharged from said threshing process and operative to crush said waste matter thereby destroying any seeds contained therein.

11. The combine of claim 10, wherein said cleaner device comprises a screen disposed under the leveling auger along the path of travel, said screen having a mesh size selected such that said grain cannot pass through said screen, while said foreign matter can pass through said screen, said screen being disposed such that said grain and foreign matter are conveyed by said auger along said screen.

12. The combine of claim 10, wherein said cleaner device further comprises a collector operatively disposed beneath said screen to collect said foreign matter as it passes through said screen.

13. The combine of claim 10, wherein said first destructor comprises a pair of oppositely rotating rollers.

14. The combine of claim 10, wherein said second destructor comprises a pair of oppositely rotating rollers.

15. A cleaner device comprising:
 a conveyor operative to convey grain and foreign matter along a path of travel;
 a screen disposed under the conveyor along the path of travel, said screen having a mesh size selected such that grain cannot pass through said screen while said foreign matter can pass through said screen, said screen being disposed such that said grain and foreign matter are conveyed by said conveyor along said screen;
 a collector operatively disposed beneath said screen to collect said foreign matter as it passes through said screen;
 a discharge provided at one end of said screen for discharge of said grain; and
 a receptacle operative to receive said grain as it is being discharged from said discharge of said screen.

16. The cleaner device of claim 15, wherein said collector includes and an inclined bottom surface so that said foreign matter collected therein travels to a lowermost point in the collector.

17. The cleaner device of claim 15, wherein said collector includes a discharge opening and an inclined bottom surface so that foreign matter travels toward said discharge opening from which said foreign matter is dispelled.

18. The cleaner device of claim 17, wherein said inclined bottom surface comprises a half tubular shape.

19. The cleaner device of claim 15, wherein said collector includes two similar trapazoidally-shaped walls disposed on opposite sides of said conveyor, each of said walls having one edge secured to a side of said conveyor and another edge secured to said inclined bottom surface.

20. A method of cleaning harvested grain comprising:
directing a collection of grain and foreign matter in the form of a stream flowing along a longitudinal direction;
screening the stream to classify the components of the stream into constituent parts;
collecting said foreign matter as it falls through upon separation by said screening; and
discharging cleaned grain for delivery to a point of utilization.

21. The method of claim 20, further comprising the step of collecting and discharging said foreign matter collected from beneath said screen 22. The method of claim 20, further comprising the step of destroying said foreign matter such that any seeds contained therein are prevented from germinating.

23. The method of claim 22, wherein said step of destroying is carried out by roller compression.

* * * * *